B. B. GOLDSMITH.
APPARATUS FOR MANUFACTURING RUBBER TUBING.
APPLICATION FILED AUG. 12, 1915.
1,168,390.
Patented Jan. 18, 1916.
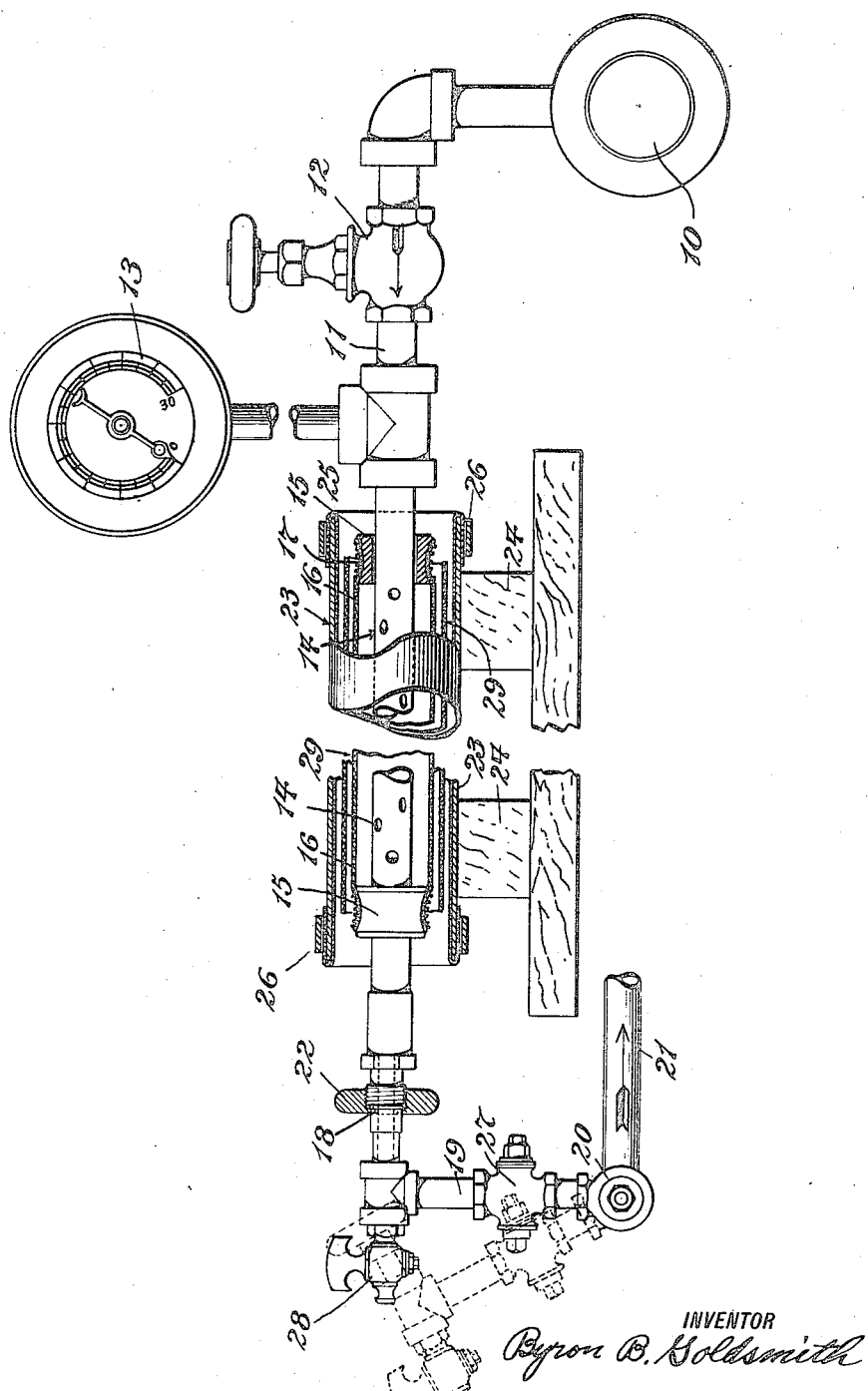
INVENTOR
Byron B. Goldsmith
BY
Wilkinson, Giusta
& MacKaye
ATTORNEYS

UNITED STATES PATENT OFFICE.

BYRON B. GOLDSMITH, OF NEW YORK, N. Y.

APPARATUS FOR MANUFACTURING RUBBER TUBING.

1,168,390.   Specification of Letters Patent.   Patented Jan. 18, 1916.

Application filed August 12, 1915. Serial No. 45,234.

*To all whom it may concern:*

Be it known that I, BYRON B. GOLDSMITH, a citizen of the United States, residing at New York, in the county of New York and State of New York, have invented certain new and useful Improvements in Apparatus for Manufacturing Rubber Tubing; and I do hereby declare the following to be a full, clear, and exact description of the invention, such as will enable others skilled in the art to which it appertains to make and use the same.

The present invention has relation to an improved apparatus for manufacturing rubber tubing; and is intended more particularly for use in connection with the process for making tubes for rubber bands fully set forth and claimed in my pending application for patent filed April 29th, 1914, Serial Number 835116. The advantages of the process in question are fully set forth in said application for patent.

In the accompanying drawing is shown my preferred steam pressure apparatus, in side elevation.

In this drawing a pipe for conveying steam (or other fluid under pressure) from a suitable source, is shown at 10; and from this a number of branch pipes 11 may be led, each commanded by its own valve 12. A gage 13 may be used to permit proper regulation of pressure as desired.

The pipe 11 is suitably perforated as at 14, between two sleeves 15 over which the ends of a vulcanized rubber tube 16 are fitted and secured, as by wire coils 17, so as to produce a steam tight expansible chamber between said sleeves.

The outer extremity of the pipe 11 has a nozzle 18, for discharging the steam into a branch tube section 19, adapted to turn around a pivotal joint 20 on the return pipe 21. A sleeve 22 is adapted to screw over the nozzle 18 to form a temporary junction.

The forming tube 23, is adapted to be slipped over the perforated portion of the pipe 11 and is carried on suitable supports, as 24. One means for forming embossed designs on the finally treated tube is to place embossed cloth, paper, rubber sheeting 25 (or the like) within the tube 23. In the drawing this is shown secured by suitable bands 26. These sheets may, of course, be omitted without departing from the invention.

In using my apparatus in making rubber bands I proceed as follows: After suitably mixing the stock, I run it out into tubes on what is known as a tubing machine. Tubes thus produced are entirely seamless, but they have a rough and irregular surface which unfits them for employment in making bands without preliminary treatment. Accordingly I form these first untreated tubes with a diameter slightly smaller than that desired for actual use in making bands. The untreated tubes are placed in suitable lengths within an outer forming tube of resistant material (preferably metal) having an internal diameter suitable to the end had in view. The internal surface of the forming tube may be smooth, or it may be embossed in designs intended to appear on the surfaces of the bands. The untreated tube, being so placed, is then uniformly expanded by fluid pressure (such as steam, air or water), preferably with heat, and is so compressed outwardly against the inner surface of the forming tube as to assume exactly the right diameter; while at the same time being made smooth enough to be suitable for making rubber bands. The tube thus formed and treated or finished, is preferably first vulcanized and then cut up in the well known manner hitherto applied to tubes with seams, and thus rubber bands of any width may be made more rapidly and cheaply than heretofore, and with far better results as to quality of product. By tilting the swinging connecting pipe 19 away from the end of the pipe 11, as shown in dotted lines in the drawing, I free the end of said pipe, so that the length of unvulcanized tube to be treated can be slipped into place as shown at 29 in the drawing. The forming tube 23 on its supports 24 is then slipped over the pipe 11 and the stock tubing to be treated, until these elements assume substantially the position shown in the drawing. The connecting pipe is then swung back into operative position, and the junction is secured at 22. Steam is then admitted at 12, and the pressure between the sleeves 15 is brought to the proper degree, as shown by the gage 13. This can be regulated by valves 12 and 27. This pressure expands the rubber tube 16 around which the untreated and unvulcanized seamless tube 29 has been placed; with the result that this latter tube is firmly compressed outward against the inner surface (removable or otherwise) of the forming tube 23, whereby it is smoothed or suitably embossed, and is given the desired uniform thickness and tubular diameter. After this process, the steam is shut off at 12, and the forming tube and treated material are removed over the end of pipe 11, after tilting away the jointed section 19.

The use of the tube 16 is convenient, but is not essential to my broad invention, as the steam (or other fluid pressure) may be applied by suitable arrangement of parts, directly to the interior of the tube to be treated.

Various changes may be made in the different parts of my apparatus and steps of my process without departing from the scope of my invention, and I do not limit myself to the details herein shown and described.

What I claim is—

1. Apparatus for making tubing of rubber and the like comprising in combination a steam pipe having a perforated portion, means for supplying steam at will to one end thereof, a tilting return connection adapted to be joined with the opposite end thereof, a removable forming tube adapted to be slipped over the end of said steam pipe, and a suitable support for said forming tube.

2. Apparatus for making tubing of rubber and the like comprising in combination a steam pipe having a perforated portion, means for supplying steam at will to one end thereof, a tilting return connection adapted to be joined with the opposite end thereof, and a movable combined support and forming tube adapted to be slipped over the end of said steam pipe.

3. Apparatus for making tubing of rubber and the like comprising in combination a steam pipe having a perforated portion, means for supplying steam at will to one end thereof, a tilting return connection adapted to be joined with the opposite end thereof, a removable forming tube adapted to be slipped over the end of said steam pipe, and a removable flexible lining for said forming tube adapted to serve as a matrix for impressing a suitable design upon the tubing to be treated.

4. Apparatus for making tubing of rubber and the like comprising in combination a steam pipe having a perforated portion, sleeves fixed to said pipe on opposite sides of said perforated portion, a flexible tube secured in a steam tight manner over said sleeves, means for supplying steam at will at one end of said pipe, a tilting return connection for the opposite end of the pipe, and a removable forming tube adapted to be slipped over said pipe and sleeves.

In testimony whereof, I have affixed my signature hereto.

BYRON B. GOLDSMITH.